April 21, 1959 — M. B. LUCKER — 2,883,008
WEDGE-OPERATED DISC BRAKE
Filed May 15, 1956 — 3 Sheets-Sheet 1

Inventor
M. B. Lucker
By Robb & Robb
Attorneys.

April 21, 1959  M. B. LUCKER  2,883,008
WEDGE-OPERATED DISC BRAKE
Filed May 15, 1956  3 Sheets-Sheet 2

Inventor
M. B. Lucker
By Robb & Robb
Attorneys

April 21, 1959  M. B. LUCKER  2,883,008
WEDGE-OPERATED DISC BRAKE
Filed May 15, 1956  3 Sheets-Sheet 3
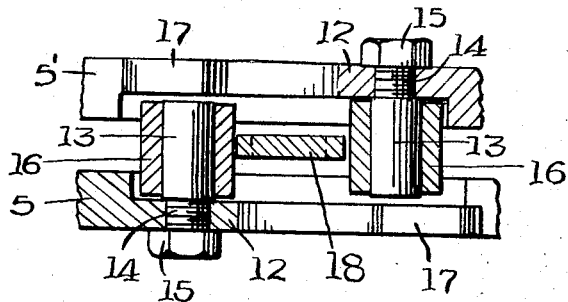
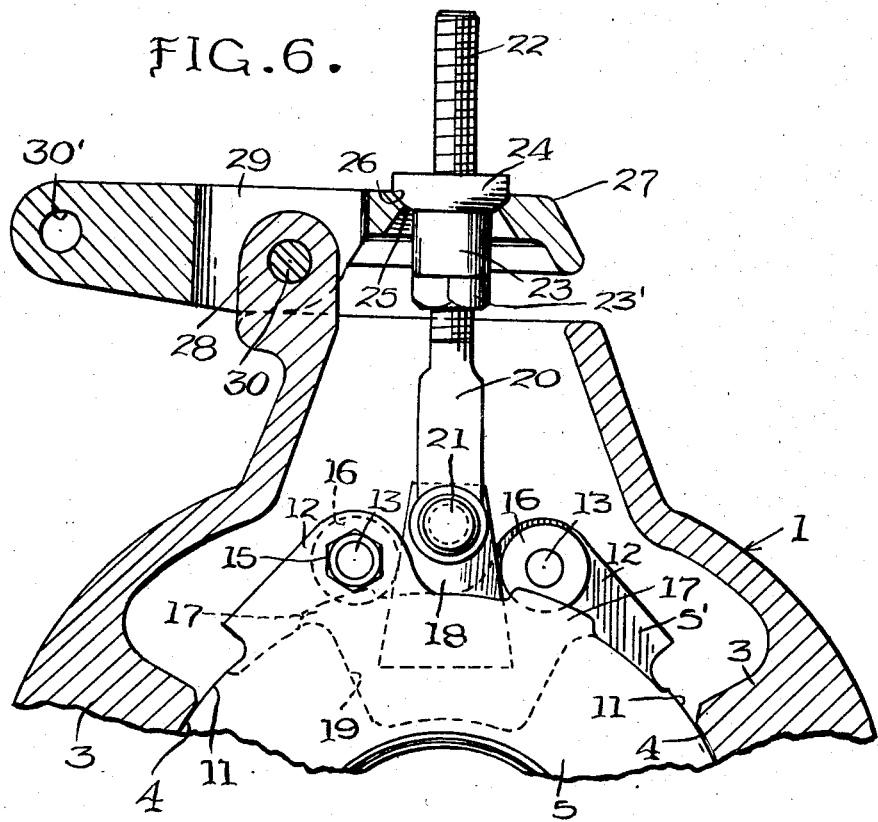
Inventor
M. B. Lucker
By Robert Cobb
Attorneys

United States Patent Office 2,883,008
Patented Apr. 21, 1959

2,883,008

WEDGE-OPERATED DISC BRAKE

Millard B. Lucker, St. Joseph, Mich., assignor, by mesne assignments, to Lambert Brake Corporation, St. Joseph, Mich., a corporation of Michigan Application May 15, 1956, Serial No. 585,024

10 Claims. (Cl. 188—72)

The present invention relates to disc brakes, and more particularly to a disc brake which is especially, though not exclusively, adapted for use on farm tractors, trucks, or other motor vehicles, or any installation where it is desirable to brake rotation of a rotary member such as an axle, power transmission shaft, or the like.

A primary objective of the invention is to provide a disc brake which is easy to manufacture, assemble, install and maintain, and which is very durable and produces an extremely powerful braking action.

Another object is to provide a disc brake as aforesaid, having a relatively stationary double-disc assembly, including a pair of slightly relatively rotatable and axially shiftable discs, camming means between the discs effecting axial separating of the discs responsive to slight rotation of one disc relative to the other, and extremely simple and efficient actuator means for effecting such slight rotation of either disc, said actuator means including a radially shiftable wedge disposed between said discs, said discs each having a roller mounted thereon and extending laterally from one side of the respective discs towards the other disc, with the rollers disposed at opposite sides of the wedge and engageable thereby to shift the discs relatively rotatively upon radial movement of said wedge in one direction with respect to said discs, and said discs having springs interconnecting the same to return the discs to their original positions upon radial movement of the wedge in the other direction.

Other objects and advantages will be hereinafter described or will become apparent to those skilled in the art, and the novel features of the invention will be defined in the appended claims.

In the accompanying drawings:

Fig. 5 is a fragmentary view in section, as taken on the line 5—5 of Fig. 1; and Fig. 6 is a fragmentary view generally corresponding to Fig. 1 and showing a modified form of actuator means made in accordance with the invention.

Figure 1:
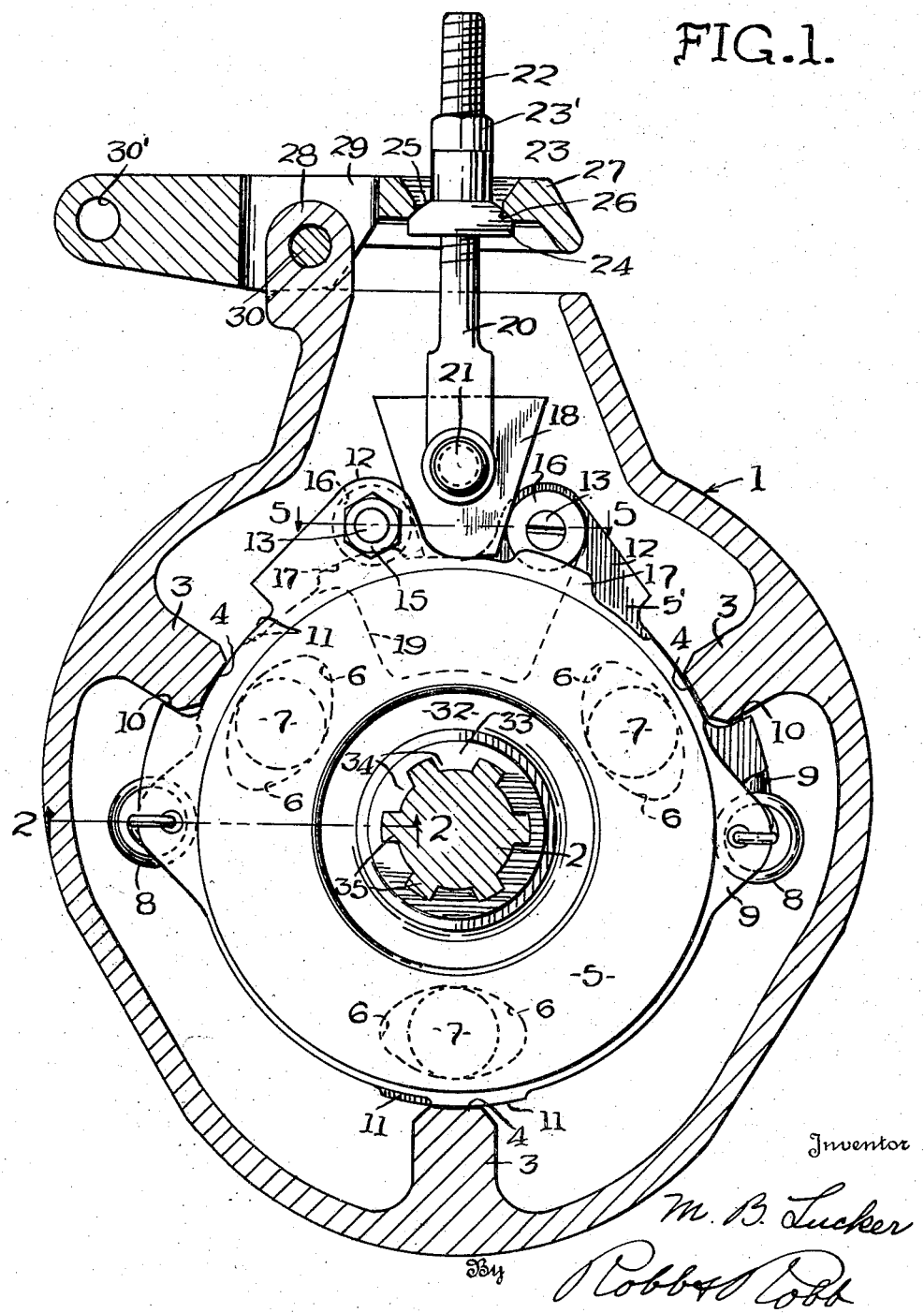
Fig. 1 is a view partly in section and partly in elevation of a brake made in accordance with the invention, with the outboard side of the brake housing broken away and one of the rotary friction discs removed so as to expose the double-disc assembly and the novel actuator means hereof.
Figure 2:
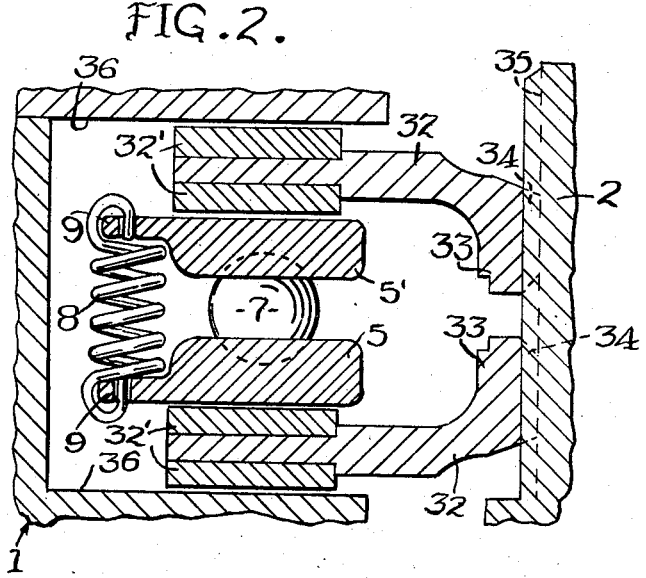
Fig. 2 is an enlarged fragmentary view in section, as taken on the line 2—2 of Fig. 1.
Figure 3:
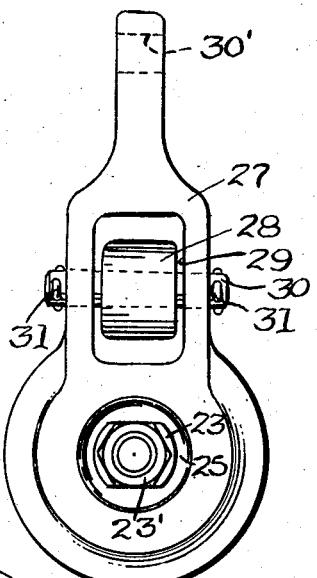
Fig. 3 is a plan view of the operating means for the brake actuator of Fig. 1.

Like reference characters in the several views of the drawings and in the following description designate corresponding parts, wherein 1 generally denotes a hollow casing or housing adapted to be fixedly mounted upon a stationary support (not shown) in any suitable manner. Such a support may be an axle housing, transmission case, or other appropriate support through which projects a rotatable axle or shaft 2 which is to be braked. Disposed in circumferentially spaced relation about the shaft 2 and projecting inwardly from the inner periphery of the housing 1 is a plurality of supporting lugs or projections 3 which terminate at their inner extremity in an arcuate bearing surface 4.

Shiftably mounted between and centrally located by the projections 3 is an assembly unit including a pair of identical discs 5, 5' which are disposed in back-to-back relation, these discs having a plurality of circumferentially spaced ramped seats 6 in the opposed faces thereof, in which are disposed a like number of hardened balls 7, and the discs 5, 5' are resiliently urged towards one another so as to confine the balls 7 in the seats 6 as by means of a suitable number of brake release springs 8. For illustrative purposes, a pair of such springs 8, 8 are shown as disposed in diametrically spaced relation and interconnected between radially outwardly projecting ears 9, 9 on the respective discs 5, 5'. One of the ears 9 of each disc is extended circumferentially and formed with a stop shoulder 10 for engagement with a face of one of the disc-supporting projections 3. In addition, each disc 5 and 5' is preferably provided on its outer periphery with a plurality of arcuate bearing sections projecting radially therefrom as at 11 for complemental engagement with the bearing surfaces 4 of the projections 3. It will be noted that one of such bearing sections 11 is disposed adjacent to the respective stop shoulders 10 of the discs 5 and 5'.

Accordingly, the double-disc assembly is supported concentrically with relation to the shaft 2 by the projections 3, and the discs 5 and 5' are each free for rotative movement in one direction, whereas the discs are respectively limited against rotation in the opposite direction by engagement of the stop shoulders 10 on the discs with the projections 3 on the housing 1.

Also projecting from the outer periphery of the respective discs 5 and 5' is a roller-supporting flange 12. Each of the flanges 12 has a cylindrical stud or pin 13 fixedly mounted thereon and projecting laterally therefrom towards the other disc. Preferably, as is best seen in Fig. 5, the pins 13, 13 are each provided with a threaded stem 14 which extends through a complemental threaded opening in the respective flanges 12, with a jam nut 15 disposed on the threaded stem 14 so as to lock each pin 13 in position. Freely journalled on the respective pins or studs 13 is a roller 12 which is retained on the stud stem 13 by a radially outwardly projecting retaining flange 17 on each disc in opposed relation to the roller-supporting flanges 12 of the respective discs when the identical discs are disposed in back-to-back relation.

Figure 4:
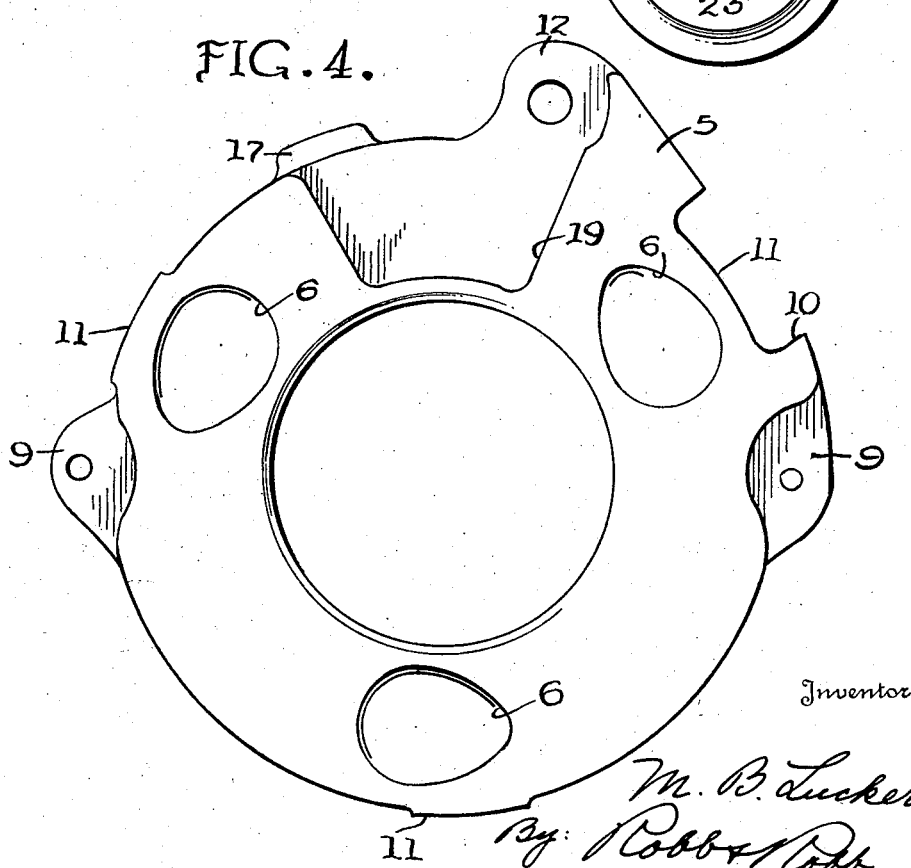
Fig. 4 is a detailed view in plan of the inner face of one of the identical double discs.

In order to effect slight rotation of one disc relative to the other, and thus to cause axial spreading of the discs through the camming action of the balls 7, a radially extended wedge 18 having its opposite tapered edges engaged with the respective rollers 16 on the discs 5 and 5', is disposed on a plane centrally located between the two discs, this wedge 18 being adapted for radial shifting movements. In order to accommodate the wedge 18, the discs are each preferably provided with a generally segmentally shaped depression or clearance space 19 as is best seen in Fig. 4.

A longitudinally extended link 20 is pivotally connected at one of its ends to the said wedge, as by means of a suitable pin or pivot bolt 21, this end of the link being forked or bifurcated so as to receive the outer extremity of the wedge, and adjacent to the other end of the link 20, said link is adapted to be pivotally connected to operating means for shifting the link and consequently the wedge radially. Preferably, the last-mentioned end of the link 20 is threaded as at 22 and has adjustably mounted thereon, a collar 23, at one end of which is a radially projecting flange 24 having an arcuate surface 25 adapted for swivelled engagement in a complemental opening 26 in one end of an operating lever 27. Also threadedly mounted on the link 20 is a jam nut 23' which is adapted to lock the collar 23 in position.

The operating lever 27 is pivotally connected to an appropriate stationary support, and preferably, such stationary support is constituted by an outstanding ear 28 on the housing 1, this support 28 projecting into an opening 29 approximately at the middle of the lever 27 and having a pivot pin 30 projecting therethrough and pivotally supporting the lever 27. The pivot pin 30 may be retained in place in any suitable manner, such as by a pair of cotter keys 31, 31 or the like. The other end of the lever 27 is provided with an opening 30' therethrough, whereby this end of the lever 27 is adapted to be operatively connected to suitable means (not shown) for rocking the lever about the pivot pin 30. Such means may be purely mechanical, but if preferred, suitable hydraulic or pneumatic operating means may be utilized.

In operation, when the lever 27, as shown in Fig. 1, is rocked about the pivot 30 in a clockwise direction, the link 20 will be shifted towards the shaft 2, thus causing a wedging action of the wedge 18 on the rollers 16 on the respective discs 5 and 5'. Such wedging action will cause a relative rotative movement of the discs which will result in an axial spreading of the discs through the camming action of the balls 7 into engagement with a pair of friction discs 32, 32 of annular form. These friction discs 32 are each provided with a central hub 33 having internal splines 34 adapted for engagement with complemental longitudinally extended splines 35 on the shaft 2, whereby the discs 32 are interconnected by the shaft 2 for simultaneous rotation. The discs 32 are each preferably provided on their opposite faces with friction lining material as at 32' for frictional engagement by the discs 5 and 5' as well as for frictional engagement with opposed friction faces 36, 36 in the housing 1.

Accordingly, as the discs 5 and 5' are forced axially apart into engagement with the friction discs 32, the latter discs will be shifted axially on the shaft 2 into engagement with the friction faces 36 in the housing 1, thereby resulting in a braking action on the discs 32, with a consequent braking action on the shaft 2.

Upon initial frictional engagement of the discs 32, 32 with the friction faces 36, 36 of the housing 1, the discs 5 and 5' will tend to rotate or "clock" along with the rotating discs 32. However, one or the other of said discs 5, 5', depending upon the direction of the rotation of the discs 32, will be precluded from rotation along with the discs 32 by engagement of the stop shoulder 10 with one of the projections 3 in the housing 1. The other of said discs 5, 5' will be free for rotation along with the discs 32, and therefore, a powerful self-energization of the brake will be effected as the drag torque of the discs 32 effects relative rotation of the discs 5, 5', and the camming balls 7 are caused to climb the inclined ramps of the ball seats 6.

Upon release of the operating means, the return springs 8 will bias the discs 5, 5' towards one another, and the balls 7 will ride back down the ramped seats 6, thereby releasing the brake.

Adjustment of the brake discs 5 and 5', in order to compensate for wear of the friction linings 32', may be accomplished by adjusting the position of the collar 23 on the threaded link 20 so as to vary the position of the wedge 18 between the respective rollers 16 on the discs 5, 5'.

In the modified construction of Fig. 6, similar reference characters are utilized, but it will be noted that the operating means has been reversed, so that the wedge 18 is adapted to be pulled radially outwardly by the link 20, instead of being pushed radially inwardly by the link 20 as in the brake previously described. Otherwise, the structure and operation of the brake of Fig. 6 is the same as that of Figs. 1 through 5.

While the specific details of the invention have been herein shown and described, changes and alterations may be resorted to without departing from the spirit thereof as defined in the appended claims.

I claim:

1. A disc brake assembly of the class described, comprising a pair of rotary members to be braked disposed in axially spaced relation and interconnected for rotation together, a pair of laterally opposed discs disposed between said members, means supporting said discs for slight rotative movements and for axial movements of one disc relative to the other, camming means between the discs for shifting the same axially into engagement with the members to be braked responsive to rotative movement of one disc relative to the other, actuator means for shifting one disc slightly rotatively relative to the other disc, and means normally urging said discs out of engagement with the members to be braked, said actuator means including a relatively thin wedge disposed between said discs and shiftable radially with respect to said discs, said wedge having opposed tapered edges and also having opposed radially extended faces respectively lying in planes spaced inwardly from the contiguous opposed faces of said discs to afford an operating clearance relative thereto, cooperative means on the respective discs projecting radially outwardly beyond the peripheral margin thereof and engageable with said tapered edges of said wedge for rotating one disc relative to the other upon radial movement of said wedge in one direction, and operating means for shifting said wedge.

2. A disc brake as defined in claim 1, wherein the cooperative means on said discs engageable with the tapered edges of said wedge include a roller journalled on each disc and projecting laterally toward the other opposed disc.

3. A disc brake as defined in claim 1, wherein the cooperative means on said discs engageable with the tapered edges of said wedge include a roller carried by each disc, a pair of pins on which the respective rollers are journalled, with one of said pins rigidly supported on each disc and projecting laterally towards the other opposed disc.

4. A disc brake assembly of the class described, comprising a pair of rotary members to be braked disposed in axially spaced relation and interconnected for rotation together, a pair of laterally opposed discs disposed between said members, means supporting said discs for slight rotative movements and for axial movements of one disc relative to the other, camming means between the discs for shifting the same axially into engagement with the members to be braked responsive to rotative movement of one disc relative to the other, actuator means for shifting one disc slightly rotatively relative to the other disc, and means normally urging said discs out of engagement with the members to be braked, said actuator means including a relatively thin wedge disposed between said discs and shiftable radially with respect to said discs, said wedge having opposed tapered edges and also having opposed radially extended faces respectively lying in planes spaced inwardly from the contiguous opposed faces of said discs to afford an operating clearance relative thereto, cooperative means on the respective discs projecting radially outwardly beyond the peripheral margins thereof and engageable with said tapered edges of said wedge for rotating one disc relative to the other upon radial movement of said wedge in one direction operating means for shifting said wedge, the aforementioned cooperative means on said disc engageable with the tapered edges of said wedge including a roller carried by each disc, a pair of cylindrical pins on which the respective rollers are freely disposed, with one of said pins rigidly supported on each disc and projecting towards the other disc, and means for retaining said rollers on said pins including a stop projection on each disc disposed in opposed relation to the roller carried by the other disc.

5. A disc brake as defined in claim 1, wherein said tapered edges of said wedge converge towards the axis of the brake.

6. A disc brake as defined in claim 1 wherein said tapered edges of said wedge diverge towards the axis of the brake.

7. A disc brake as defined in claim 1, wherein said operating means includes a longitudinally extended link pivotally connected at one of its ends to said wedge and projecting at its other end exteriorly of the brake assembly, means mounted exteriorly of the brake assembly for shifting said link to shift said wedge radially, and means adjustably connecting the other end of said link to the said link-shifting means for adjusting the radial disposition of said wedge in relation to said discs.

8. A disc brake as defined in claim 1, wherein said operating means includes a pivotal lever mounted exteriorly of the brake assembly, a link disposed between said wedge and said lever, means pivotally connecting said link at one of its ends to said wedge, and means disposed exteriorly of said brake assembly for pivotally connecting said link adjacent to its other end to said lever.

9. Operating means for a disc brake having a plurality of disc-like members disposed in side-by-side axially spaced relation, with one of said disc-like members shiftable axially and rotatively relative to another disc-like member for effecting engagement and disengagement of the brake responsive to the camming action of camming means operative upon said rotatable disc-like member, said operating means including a radially extended relatively thin wedge, said wedge having opposite tapered edges and also having opposed radially extended faces respectively lying in planes spaced inwardly from the contiguous opposed faces of said discs to afford an operating clearance relative thereto, means for shifting said wedge radially with relation to said disc-like members, cooperative means on said rotatable disc-like member and on the adjacent disc-like member projecting radially outwardly beyond the peripheral margin thereof and engageable with the tapered edges of said wedge for effecting rotation of said rotatable disc-like member upon movement of said wedge in one direction, and means normally biasing said rotatable disc-like member in the opposite direction.

10. Operating means for a disc brake having a plurality of disc-like members disposed in side-by-side axially spaced relation, with one of said disc-like members shiftable axially and rotatively relative to another disc-like member for effecting engagement and disengagement of the brake responsive to the camming action of camming means operative upon said rotatable disc-like member, said operating means including a radially extended relatively thin wedge, said wedge having opposite tapered edges and also having opposed radially extended faces respectively lying in planes spaced inwardly from the contiguous opposed faces of said discs to afford an operating clearance relative thereto, means for shifting said wedge radially with relation to said disc-like members, cooperative means on said rotatable disc-like member and on the adjacent disc-like member projecting radially outwardly beyond the peripheral margin thereof and engageable with the tapered edges of said wedge for effecting rotation of said rotatable disc-like member upon movement of said wedge in one direction, means normally biasing said rotatable disc-like member in the opposite direction, the aforesaid cooperative means engageable with said wedge for rotating said rotatable disc-like member including a pair of rollers respectively journalled on said rotatable disc-like member and on said adjacent disc-like member, said last-mentioned disc-like members each having a pin carried thereby on which said rollers are freely mounted, and said disc-like members each also having a portion engageable with the roller on the other disc to retain the rollers on said pins.

References Cited in the file of this patent

UNITED STATES PATENTS

| 1,845,505 | Lockyear | Feb. 16, 1932 |
| 1,866,419 | Norton | July 5, 1932 |
| 1,875,391 | Parker | Sept. 6, 1932 |
| 2,329,097 | Ash | Sept. 7, 1943 |
| 2,387,039 | Parrett | Oct. 16, 1945 |
| 2,555,651 | Lambert et al. | June 5, 1951 |

FOREIGN PATENTS

| 745,297 | Germany | Mar. 24, 1944 |